Reissued Sept. 17, 1935 Re. 19,710

UNITED STATES PATENT OFFICE 19,710

CONDENSATION PRODUCT AND METHOD OF MAKING SAME

Fritz Pollak, Vienna, Austria, and Alfons Ostersetzer, Melegnano, near Milan, Italy, assignors, by mesne assignments, to Catalin Corporation of America, Fords, N. J., a corporation of Delaware No Drawing. Original No. 1,854,606, dated April 19, 1932, Serial No. 134,128, September 7, 1926. Application for reissue December 16, 1933, Serial No. 702,724. In Austria March 17, 1926

17 Claims. (Cl. 260—4)

This invention relates to an improved method of reacting with formaldehyde upon phenol or on a phenolic body and to the improved product resulting from such reaction.

The resin resulting as an intermediate product from the known condensation of phenols with formaldehyde in the presence of small quantities of basic condensing agents possesses markedly hydrophobic properties. After completion of the condensation process, it is separated from the reaction material in the presence of heat, so that the supernatant water may be poured off. By the transformation (known as hardening) of the resin-like intermediate product into the insoluble and infusible final product, with the aid of heat, preferably homogeneous systems are produced, which do not include any noticeable capillary cells. Hence such artificial material does not take up any measurable amount of any liquid.

Also the products of this kind prepared according to earlier processes by employing large quantities of condensing agents having a basic action, in which processes separation of the resin from the solution does not take place, but wherein the clear solution is successively transformed by evaporation of the solvent into a homogeneous, semi-liquid, tenacious mass, yield the same or very similar monophase final products. These final products as obtained by any of the known methods, have several valuable properties, but there is one drawback inherent in them, which consists in their being rather brittle, so that working them mechanically, for instance on the lathe or the like, is difficult.

The inventors have been successful in producing final products of the said reaction, which have the structure of true gels, as they include demonstrable capillarities. The artificial material made according to this invention has, in comparison with the known phenol-formaldehyde condensation products, the advantage that they can more easily be worked.

In order to obtain these new final products by the known reaction, the condensation products must be in a state of extremely fine dispersion and furthermore also a very high degree of hydration, and also must be stable. For generating condensation products possessing the first two of these properties it is in the first instance necessary that the molecule of the phenol-formaldehyde condensation products be enlarged. From the hitherto known behaviour of formaldehyde it was to be expected that such enlargement of the molecule may most conveniently be brought about by increasing the quantity of formaldehyde chemically combined in the final product and this assumption has proved to be correct. Material having the above mentioned properties can only be obtained, if far larger proportions of formaldehyde are introduced into the reaction than the usual ratio of equal parts by weight of phenol and commercial formaldehyde solution which heretofore have been used to yield an approximately equi-molecular ratio of phenol and formaldehyde. The most favorable results are obtained when the final product contains formaldehyde at the rate of 1 molecule of phenol to about 2½ molecules of formaldehyde.

The condensation products having such chemical constitution must according to the present invention be brought into the state of colloidal dispersion. This is preferably achieved by starting from systems of highest dispersion, that is to say from totally or partly molecular solutions, and by reducing the degree of dispersion down to the colloidal dispersion according to the principle of the colloid-chemical "condensation method." The colloidal solution of a hydrophilic condensation product thus obtained is, a clear sol, from which also on cooling no resin is precipitated, but which on the contrary in the course of a slowly proceeding concentration, sets to a true jelly by including the dispersion medium still present, namely the water. When this jelly is hardened by using heat, a polyphasic system is obtained, viz. a dry and hard gel, the pores of which contain particles of water of colloidal size. Owing to this fact the material is cloudy (non-transparent) and has a color white as snow.

It results from the foregoing, that a condensation product made up from phenol and formaldehyde in the ratio of 1 molecule of phenol to about 2½ molecules of formaldehyde is to be brought into the state of colloidal solution, preferably by reducing the degree of dispersion of a system of highest dispersion, whereafter the sol thus produced is allowed to set to a jelly which is then hardened with the aid of heat.

According to the invention the sol is most advantageously produced by causing the condensation of the reaction constituents (brought together in the proportion of 1 molecule of phenol to about 2½ molecules of formaldehyde), to take place in the presence of such large quantities of a basically acting condensing agent, that the condensation product obtained is not precipitated, but remains in solution; or if some hydrophobic resin is precipitated the said product is subsequently heated with an amount of caustic alkali solution causing it to be dissolved again.

The solution is then neutralized and thickened by distilling off water to a point at which the sol thus formed gelatinizes in the presence of heat. The jelly now contains a certain quantity of water in a state of such stable absorption, that the water is to be found even within the hardened final product in the form of very minute drops of colloidal size. Accurate measurement has shown that the diameter of these particles of water measures from 0.1$\mu$ to 10$\mu$.

For obtaining perfectly light-resisting products a further condition has to be fulfilled, which consists in that the hardening process has to take place in a mixture having a weakly acid reaction.

A method of carrying the invention into practice was evolved from the above. A reaction mixture composed at the rate of 1 molecule of phenol to about 2½ molecules of formaldehyde is heated in the course of any stage or phase of the condensation process in the presence of large quantities of condensing agents having basic properties, so that the condensation product is not precipitated, but remains in solution. The solution is then neutralized and thickened, the resulting sol being caused to gelatinize. The jelly is finally hardened, preferably in a weakly acid medium.

If according to one of the usual methods a resin soluble in alcohol is made from 1 molecule of phenol and 1 molecule of formaldehyde in the presence of small quantities of bases as condensing agents, and if this resin is then freed as completely as possible from the supernatent water, from the free phenol and from the free formaldehye, and is then thickened in a vacuum, it is possible by adding about 10% of water, to cause the water to be taken up by the resin by being dissolved in the latter. But in whatever manner the resin may be treated subsequently, the water will always segregate again in the form of microscopic particles. The diameter of the separated minute drops of water is about 100 $\mu$, so that these drops are about 100 times to 1,000 times as large as colloidal particles. Also, the resin stratified therebetween has a dispersion far above colloidal size. The resulting final product is brittle and cannot be worked mechanically except with difficulty and is moreover extremely sensitive to the action of light. This is evidently due to the fact, that the coarsely dispersed drops of water, only mechanically retained by the resin, will exercise, in presence of small quantities of the alkaline or acid substances (always to be found in these masses) a saponifying action on all those compounds contained in the material, and which are of an unstable nature. This is probably due to the fact that they contain etherlike bonds in the molecule. The phenol is thus produced, which assumes a dark color under the action of light.

For obtaining the effect aimed at by the invention it is not necessary that the whole amount of formaldehyde required for the proportion of 1 molecule of phenol to about 2½ molecules formaldehyde be present from the very beginning. On the contrary, the balance required for attaining this ratio may also be subsequently added to the initial condensation products generated. However the full amount of formaldehyde must be present at the moment the strongly alkaline phase of condensation sets in. Consequently condensation may be carried out at first either in a weak acid or in a weak alkaline medium and also with insufficient quantities of formaldehyde. The resulting initial condensation products are quite capable during the subsequent treatment under the action of the required amount of alkaline condensing agents and in the presence of the necessary excess of formaldehyde, of being converted into hydrophile, colloidally soluble condensation products, the production of which is of essential importance for the manufacture of the new polyphasic final product. The subsequent hardening process should be carried out in a weakly acid reaction medium in order to obtain products of the highest resistance to the influences of light.

The most advantageous method of operation appears to be the following: First of all a soluble, shellac-like resin is prepared in an acid solution by the reaction of 2 molecules of phenol with 1 molecule of formaldehyde, whereafter condensation is continued with a further 4 molecules of formaldehyde, in a strongly alkaline reaction medium. The material is then neutralized, thickened to gelatinization and finally hardened in a weakly acid reaction medium. The diameter of the water particles is in such case between 0.3 and 0.5 $\mu$.

Moreover it is immaterial what kind of condensing agent is employed in any single case, provided that any strongly alkaline phase is caused to take place at any stage of the condensation process. Finally, in contrast with all known methods the proportion in which condensing agents are used is not essential. However, for economical reasons and furthermore for the purpose of simplifying the process, it may nevertheless be recommended not to use an unnecessarily high proportion of condensing agents in general as well as during the strongly alkaline condensation phase.

According to a preferred method of carrying the invention into practice acids are selected for neutralizing the reaction material after the condensation is completed, the salts of which split off free acids under the action of warm water. The neutralization thus produced simultaneously brings about the weakly acid reaction required in the hardening phase. Acids of this kind are for instance monochloracetic acid, dichloracetic acid, dibromacetic acid, chloropropionoacetic acid and the like. By boiling monochloracetic sodium, mainly glycolic acid is liberated, so that a weakly organic acid reaction takes place which highly assists the hardening operation.

Moreover weak organic acids may be used directly as neutralizing agents, but this entails the disadvantage that the alkali salts thereof act as free alkalies on the condensation products under consideration and consequently the final products are more sensitive to the influence of light.

*Example 1*

200 parts by weight of crystallized carbolic acid, 600 parts by weight of formaldehyde solution at 30% by weight, and 5 parts by weight of a double normal solution of hydrochloric acid are heated together until an exothermic reaction sets in. The mass is now boiled until the insoluble condensation product is separated. As soon as this separation has taken place, 80 parts by weight of a double normal solution of caustic soda lye are added, whereby a strong exothermic reaction again takes place. When this reaction begins to weaken, 75 parts by weight of a double normal solution of monochloracetic acid are added to the solution and then the mass is subjected to distillation in a vacuum until the product is clear. The mass now constitutes a sol remaining clear in the hot state as well as during cooling, which sol, when poured into molds at a temperature of 60° to 65° C. gelatinizes after about 24 hours, remaining still perfectly clear during gelatinization. After a further period of 24 hours the mass begins to cloud (become cloudy) and finally becomes as white as snow. If the mass is kept for a further 48 hours at a temperature of 75° to 80° C. it finally becomes perfectly hard.

*Example 2*

200 parts by weight of crystallized carbolic acid, 200 parts by weight of formaldehyde containing 30% by weight, and 8 cubic centimeters of double normal caustic soda solution are mixed together and boiled in a boiler provided with a reflux condenser until an oily layer containing the condensation product separates. The mass is then neutralized by means of 8 parts by weight of a double normal solution of monochloracetic acid, with the addition of 400 parts by weight of formaldehyde (containing 30% by weight) and 5 parts by weight of a double normal solution of hydrochloric acid. The mass is then boiled under reflux for ½ hour, whereby the resin is separated, 80 parts by weight of double normal caustic soda solution are now added to the mixture and boiling under reflux is continued, until the appearing weak exothermic reaction that had set in ceases. 75 parts by weight of a double normal solution of monochloracetic acid are now added and the remaining steps are taken as Example 1. In this example, if "parts by weight" is taken as representing grams, "parts by volume" is to be taken as representing cubic centimeters.

*Example 3*

200 parts by weight of crystallized phenol are heated with 600 parts by weight of commercial formaldehyde (at 30% by weight) and 80 parts by weight of double normal caustic soda solution in a boiler provided with a reflux condenser. A strong exothermic reaction sets in, after which 80 parts by weight of a double normal solution of monochloracetic acid are added. The operations are then continued as indicated in Example 1.

Also in the methods according to Examples 2 and 3 no separation of the dispersion medium takes place prior to the beginning of the gelatinization. The clouding of the jelly, however, appears somewhat earlier in these two cases than in the case of Example 1.

The new material can be colored in the course of the described operations to any desired tint.

Instead of starting, as has been indicated in the examples, from crystallized phenol $C_6H_5OH$, the latter may be substituted by its homologues, particularly by metacresol.

What we claim is:

1. A process for the manufacture of condensation products of a phenolic body and formaldehyde, which comprises producing a colloidal solution of a condensation product the composition of which is in the proportion of 1 molecule of phenolic body to about 2.5 molecules of formaldehyde, in the presence of excess of alkali, neutralizing the excess alkali and thereafter removing sufficient water from the sol to give a gel and thereafter hardening the gel by heat.

2. A method of making non-transparent condensation products of formaldehyde with phenolic bodies, by heating a reaction mixture having approximately the proportion of 1 molecule of phenolic body to about 2.5 molecules of formaldehyde, at any stage of the condensation process in the presence of a condensing agent having an alkaline reaction, the quantities of such condensing agent being such as to prevent precipitation of the condensation product by such heating step, whereby the latter remains dissolved, the solution being thereafter neutralized and then thickened by heating, the sol thus produced being allowed to gelatinize and the gel being finally hardened by heating.

3. In the process of claim 2, the step of effecting the final hardening in the presence of a weakly acid menstruum.

4. A method of carrying out the process as claimed in claim 1, which comprises adding a halogenated fatty acid for neutralizing the material after condensation is completed, the salts of such acid splitting off free acids by the action of hot water.

5. Process for the manufacture of condensation products from a phenol and formaldehyde, distinguished thereby that a reaction mixture containing a phenol and an aldehyde, approximately in the proportion of 1 mol. of phenol to 2.5 mols formaldehyde at least in the last phase of the condensation process, in the presence of alkaline reacting condensation agents in an amount corresponding to at least 0.32% by weight of NaOH as compared with the weight of phenol, is heated so that the condensation product does not precipitate but remains in solution, whereupon the solution is neutralized and then thickened by heating, the sol thus formed allowed to gelatinize and the gel obtained hardened.

6. In the production of phenol-formaldehyde condensation products, the herein described process which comprises forming a condensation product of 1 mol. of a phenol with at least about 2.5 mols of formaldehyde, which is effected while said molar ratio exists and is conducted in the presence of a substantial excess of alkali as a condensing agent, heating the condensation mixture sufficiently to leave a liquid solution of the condensation product, then neutralizing such solution and then thickening the same by heating, allowing the sol thereby produced to gelatinize and hardening the gel thereby formed.

7. A condensation product of a phenol and formaldehyde containing the reaction product of 1 mol. of a phenol and at least about 2.5 mols of formaldehyde, which products have a detectable cellular structure in their final hard condition, caused by the presence throughout the mass of water in a colloidally dispersed condition.

8. A condensation product of a phenol and formaldehyde containing the reaction product of 1 mol. of a phenol and at least about 2.5 mols of formaldehyde, which products have a detectable cellular structure in their final hard condition, caused by the presence throughout the mass, of water in a colloidally dispersed condition, such products being white in color and being fast against light.

9. The process which comprises condensing a phenolic body with a substantially greater molecular proportion of formaldehyde than phenol, causing at least a part of such reaction to take place in an aqueous solution of an alkaline condensing agent, stopping such reaction while the reaction products are in solution in the water present and substantially neutralizing, thereafter removing water by distillation while maintaining said reaction products substantially in solution to give a gel, and finally hardening said reaction products while maintaining an appreciable percentage of water present.

10. A process as specified in claim 9, in which the alkaline condensing agent consists of about 3% of an alkali hydroxide as compared with the weight of phenol used, and the gel is weakly acid during the hardening.

11. The process which comprises condensing a phenolic body with a substantially greater molecular proportion of formaldehyde than phenol and conducting at least a final part of such reaction in the presence of an aqueous solution of an alkaline condensing agent present in sufficient amount to hold the condensation product in solution until an advanced stage of condensation is reached, stopping such reaction after such advanced stage of condensation is reached but while the reaction products are in solution in the water present and neutralizing, and thereafter distilling off water to produce a gel and hardening the gel by heat.

12. The process of producing resinous reaction products of phenol and formaldehyde which comprises the steps of causing phenol to react with formaldehyde in the presence of an alkaline catalyst in a proportion such that the ratio of formaldehyde to phenol is far larger than equal molecular proportions, conducting such reaction under conditions which will substantially inhibit the precipitation of resin in the alkaline solution so that a sol is formed, adding acid so that the mass will have a weakly acid reaction and slowly concentrating the sol produced by the said reaction by evaporating off water to a point at which the sol gelatinizes in the presence of heat, heating to form a gel including the water present, and hardening such gel to yield a product having pores which contain dispersed particles of water of a size with a diameter less than 10$\mu$.

13. A process as specified in claim 12, in which the acid added is an organic acid.

14. A condensation product of phenol and formaldehyde containing the reaction products of phenol and formaldehyde in a proportion far larger than one molecule of formaldehyde to one molecule of phenol, which products in their final hard condition contain water throughout the mass in a colloidally dispersed condition of a particle size having a diameter less than 10$\mu$ and have approximately the colloidal structure of a hardened gel produced from a weakly acidified sol of the reaction products of approximately one molecule of phenol reacted in an alkaline medium with about 2.5 mols of formaldehyde.

15. A condensation product of a phenol and formaldehyde containing the reaction products of approximately 1 mol of a phenol and about 2.5 mols of formaldehyde reacted to form a hardened gel, which products have a determinable cellular structure in their final hard condition, caused by the presence throughout the mass of water in a dispersed condition and of a particle size having a diameter less than 10$\mu$.

16. A non-transparent phenol-formaldehyde condensation product containing water dispersed throughout the mass in a colloidal condition and consisting essentially of the reaction products obtained by heating a reaction mixture having approximately the proportion of 1 molecule of phenolic body to about 2.5 molecules of formaldehyde, at any stage of the condensation process, in the presence of a condensing agent having an alkaline reaction, the quantities of such condensing agent being such as to prevent precipitation of the condensation product by such heating step, whereby the latter remains dissolved, the solution being thereafter neutralized and then thickened by heating, the sol thus produced being allowed to gelatinize and the gel being finally hardened by heating to produce the aforesaid condensation product.

17. A phenol-formaldehyde condensation product containing water dispersed throughout the mass in a colloidal condition with a particle size having a diameter not greater than 10$\mu$, and consisting essentially of the reaction products obtained by causing a phenolic body to react with formaldehyde, in a proportion such that the ratio of formaldehyde to phenol is far larger than equal molecular proportions, in the presence of a condensing agent having an alkaline reaction, the quantities of such condensing agent being such as to prevent precipitation of the condensation product by such heating step, whereby the latter remains dissolved, the solution being thereafter rendered slightly acid and being thickened by heating, the sol thus produced being allowed to gelatinize and the gel being finally hardened by heating to produce the aforesaid condensation product.

ALFONS OSTERSETZER.
FRITZ POLLAK.